(12) United States Patent
Cetinkunt et al.

(10) Patent No.: US 6,330,502 B1
(45) Date of Patent: Dec. 11, 2001

(54) METHOD AND SYSTEM FOR SELECTING DESIRED RESPONSE OF AN ELECTRONIC-CONTROLLED SUB-SYSTEM

(75) Inventors: Sabri Cetinkunt, Oak Park; Chenyao Chen, Glenview; Aleksandar M Egelja, Naperville; Richard G. Ingram, St. Charles; Thomas P. Muller, Montgomery, all of IL (US); Unnat Pinsopon, Bangkok (TH)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/576,302

(22) Filed: May 23, 2000

(51) Int. Cl.[7] .................................................. G06F 17/00
(52) U.S. Cl. ................... 701/50; 701/36; 37/414
(58) Field of Search .................. 701/50, 36, 104, 701/2; 37/414, 415

(56) References Cited

U.S. PATENT DOCUMENTS

| | | |
|---|---|---|
| 4,570,217 | 2/1986 | Allen et al. . |
| 4,910,658 | 3/1990 | Dudash et al. . |
| 5,285,381 | 2/1994 | Iskarous et al. . |
| 5,668,573 | 9/1997 | Favot et al. . |
| 5,875,108 | 2/1999 | Hoffberg et al. . |
| 5,889,671 | 3/1999 | Autermann et al. . |
| 5,899,950 | 5/1999 | Milender et al. . |
| 5,909,372 | 6/1999 | Thybo . |
| 6,195,604 | * 2/2001 | Moore et al. ............................ 701/50 |
| 6,246,939 | * 6/2001 | Nozawa et al. ......................... 701/50 |
| 6,249,727 | * 6/2001 | Muller ..................................... 701/50 |

FOREIGN PATENT DOCUMENTS

001624097 * 1/1991 (SU) ....................................... 701/50

* cited by examiner

*Primary Examiner*—Richard M. Camby
(74) *Attorney, Agent, or Firm*—Howard & Howard

(57) ABSTRACT

A method and system for altering operating behavior of a sub-system component of a machine to suit a user's preference includes a database for storing a plurality of parameters associated with the operating behavior of the sub-system component. The parameters have sets of values associated therewith wherein each set of values define one of a plurality of acceptable operating behaviors for the sub-system component. A sub-system controller receives a selection signal from the operator via a user interface selecting one of the set of values of the parameters according to his/her preference. The sub-system controller then controls the sub-system component based on the selected set of values for the parameters.

13 Claims, 4 Drawing Sheets

METHOD AND SYSTEM FOR SELECTING DESIRED RESPONSE OF AN ELECTRONIC-CONTROLLED SUB-SYSTEM

TECHNICAL FIELD

This invention relates generally to methods and systems for controlling electronically controlled sub-systems and, more particularly, to methods and systems for selecting a desired response of an electronic controlled sub-system associated with work machines.

BACKGROUND ART

Mechanically controlled machines have a disadvantage in that their characteristics are fixed into the design. For instance, in mechanically controlled earth moving machines, the relation between operator lever and implement speed is manufactured into the mechanisms that connect the lever motion to the mechanism that shifts the spool. Once built, that relationship is fixed and cannot be changed on the fly. Even the current generation of electronically controlled machines, wherein the characteristics are programmed in software, have fixed characteristics that cannot be altered on the fly, unless the code is changed and entered into the machine controller box.

A user of a machine, however, may not feel comfortable operating a machine with predetermined characteristics. Perhaps they are proficient in the use of the machine and prefer a different than what is designed into the machine. Such inflexibility may lead to production loss for that operator. Another situation in which a different response may be desired, is when a novice operator is operating a machine. A novice operator may be pushing the machine beyond its normal operating ranges, therefor, it may be desirable to have different responses to avoid damage to a machine.

Thus, there is a need for allowing an operator of a machine to select a desired response of an electronically controlled sub-system associated with a work machine.

The present invention is directed to overcome one or more of the problems as set forth above.

DISCLOSURE OF THE INVENTION

In one aspect of this invention, a method is provided for altering the machine sub-system behavior machine to suit a user's preference. The method includes storing a plurality of parameters associated with the operation behavior of the sub-system wherein the parameters have a set of values associated therewith. Each set of values define one of a plurality of acceptable operating behaviors for that sub-system. The method further includes receiving a selection signal selecting one of the set of values of the parameters, and controlling the sub-system based on the selected set of values for the parameters.

In another aspect of the invention, a system is also provided for carrying out the step of the above described method. The system includes a database for storing a plurality of parameters associated with the operating behavior of the sub-system wherein the parameters have sets of values associated therewith. Each set of values defines one of a plurality of acceptable operating behaviors for that sub-system. The system further includes a controller in communication with the database, for receiving a selection signal selecting one of the set of values of the parameter and controlling the sub-system based on the selected set of values of the parameters.

BEST MODE FOR CARRYING OUT THE INVENTION

Figure 1:
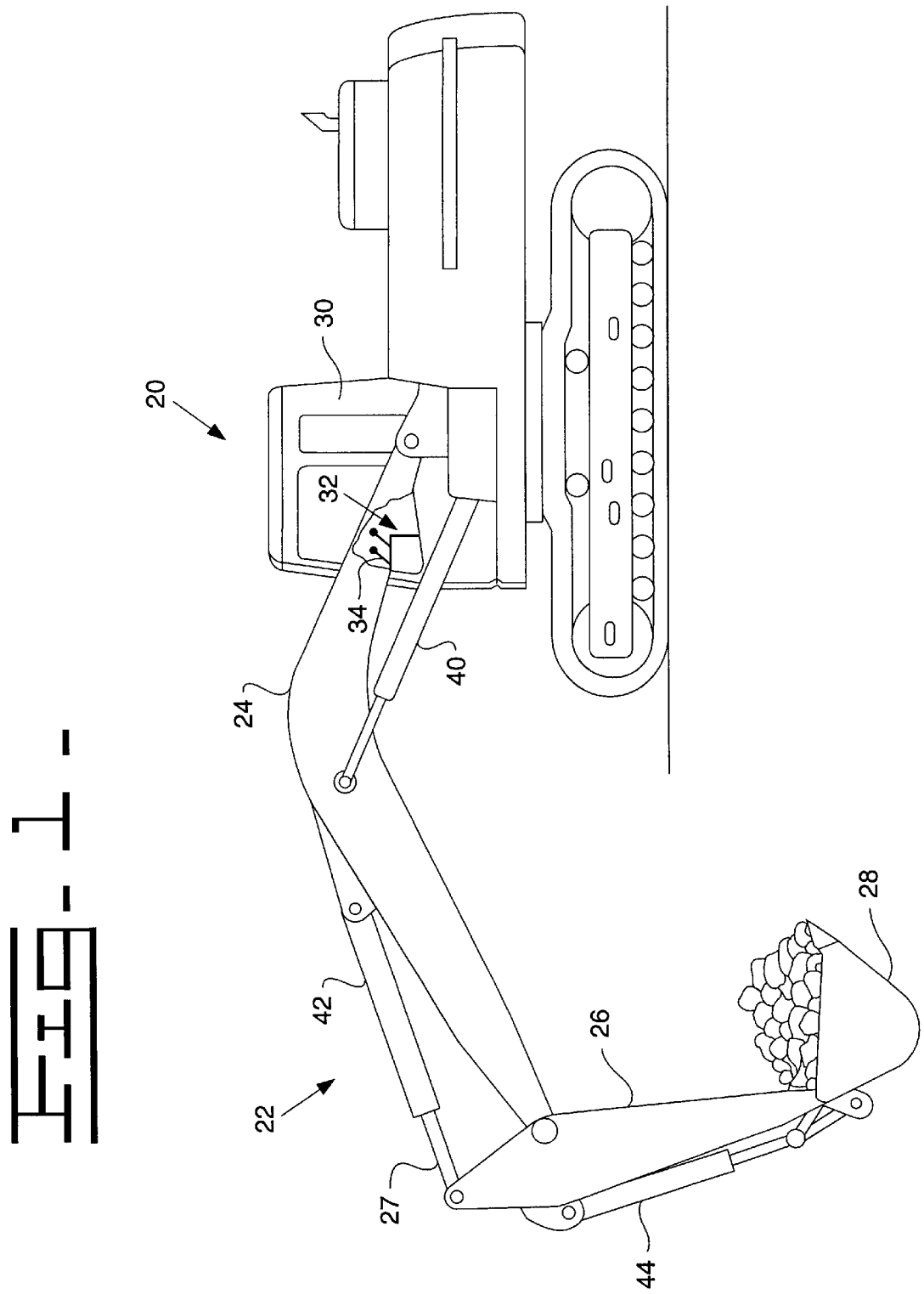
FIG. 1 is a diagrammatic illustration of one possible work machine that can include a control system designed to this invention.

FIG. 1 diagrammatically illustrates a heavy duty work machine 20 incorporating the present invention. The present invention, however, is not limited to work machines, but is applicable to other machines having sub-systems, such as a vehicle having an engine, transmission, and steering sub-system. The illustrated work machine is commonly referred to as a hydraulic excavator. It is important to note that this invention is not limited to use with hydraulic excavators. A variety of work machines that require movement of more than one component to complete w work function can be operated using the method and system of this invention. Other types of machines for which this invention is useful include track loaders, wheel loaders, and the like.

The machine 20 includes work implement 22 having moveable members that are moveable into a variety of positions to perform various work functions. The work implement 22 includes lift arm 24, bucket link 26, and work attachment 28, shown here as a bucket.

The work implement 22 is supported by the machine body portion 30, which houses the engine and supports an operator compartment. A control panel 32 is positioned within the operator compartment so that the operator can manipulate a plurality of levers 34 to move the work implement 22 at various speeds through a series of positions.

The lift arm 24 is moved relative to the machine body portion 30 by hydraulic cylinder 40, which is normally controlled by movement of one of the levers 34. Similarly, the work attachment 28 is moved relative to the lift arm 24 through hydraulic cylinder 42, and bucket link 26. The levers 34 enable the operator to control the speed of operation of a respective one of the hydraulic cylinders 40, 42 and 44 for manipulating the work implement 22.

Figure 2:
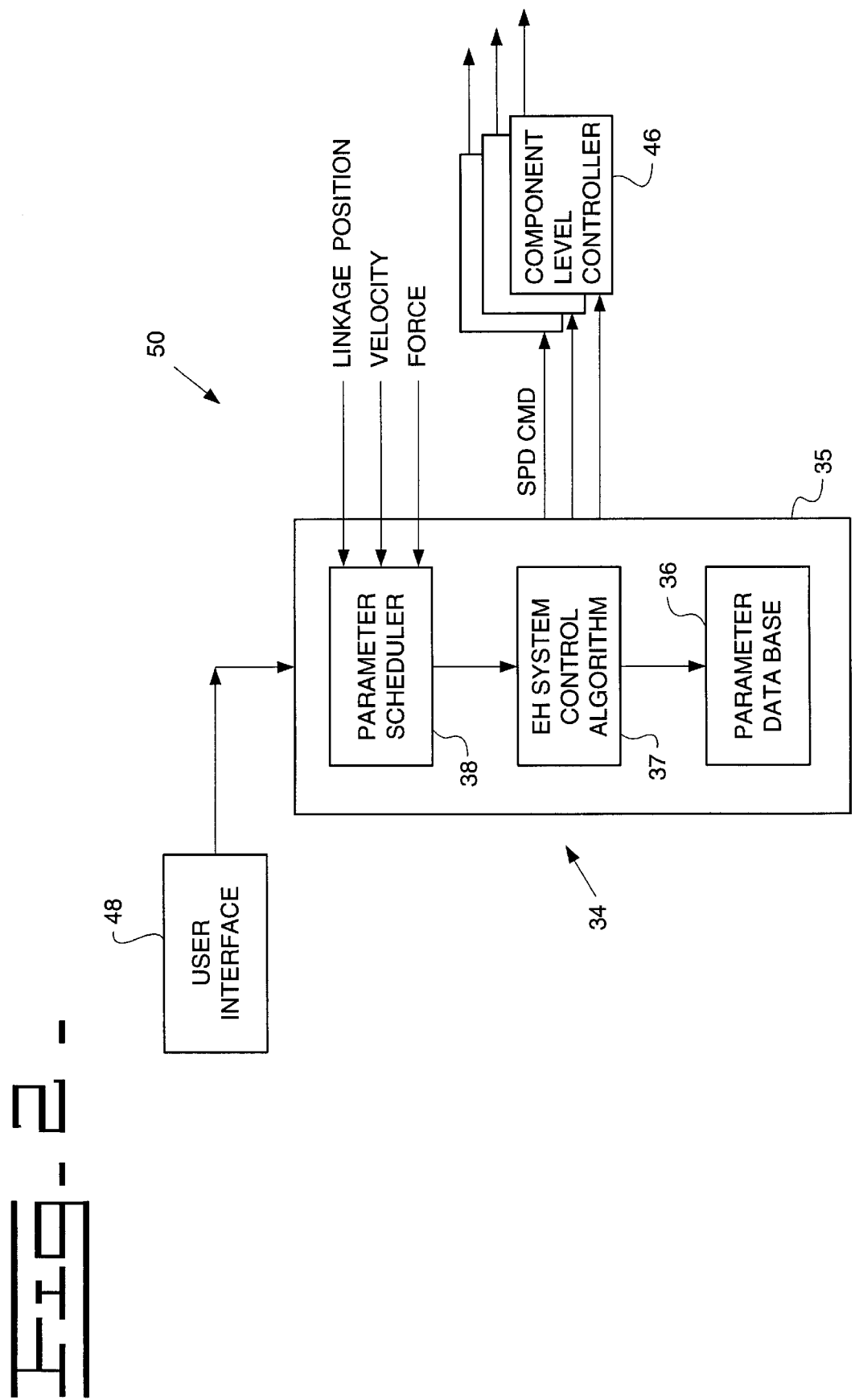
FIG. 2 is a block diagram of a sub-system controller according to the present invention.
Figure 3:
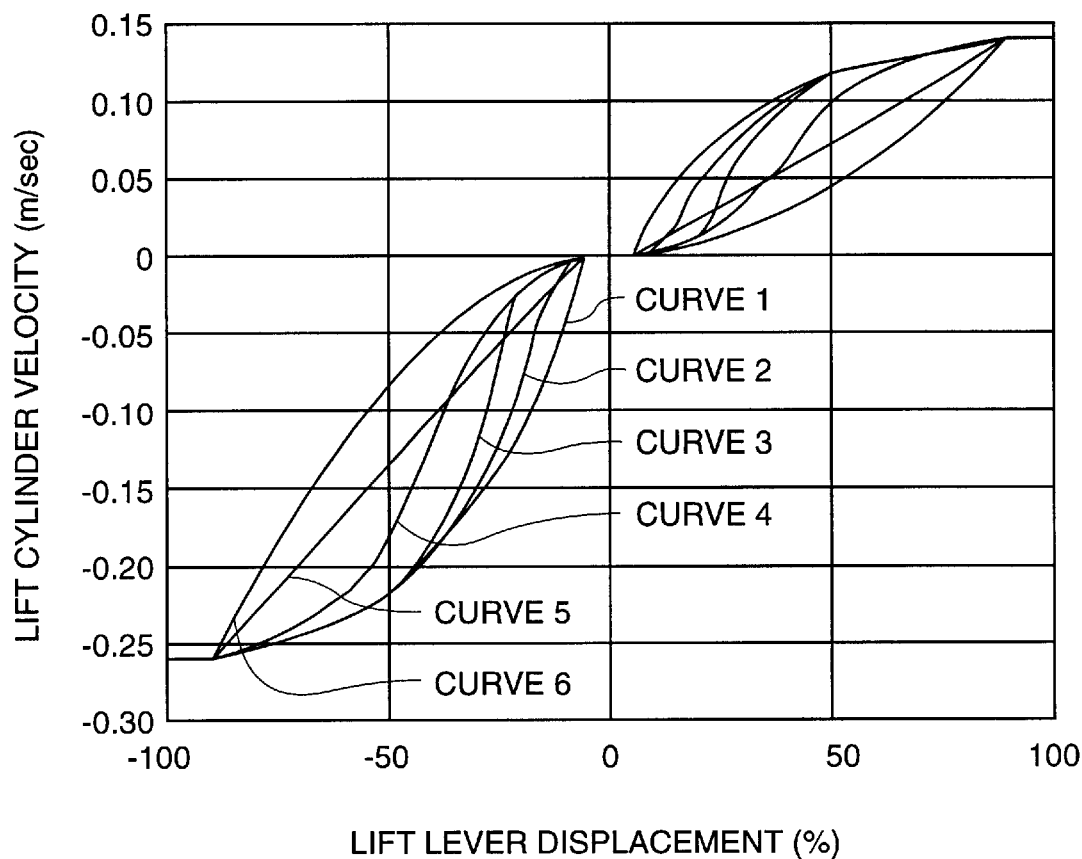
FIG. 3 is a graph illustrating some of many different acceptable relationships between steady-state speed of a cylinder and various relative lever positions associated with the cylinder.

Turning now to FIG. 2, there is shown a system 50 according to the present invention. The system 50 includes a parameter database 36 for storing a plurality of parameters associated with the operating behavior of each sub-system to be controlled by sub-system controller 35. The parameters have sets of values associated therewith wherein each set of values defines one of a plurality of acceptable operating behaviors for its sub-system. For example, FIG. 3 is a graph illustrating the different possible modulation curves defining possible responses between lift lever displacement versus lift cylinder velocity for a work machine. Any one of these curves may be used to define this relationship. However, one curve may be better than the other depending on the application with which the work implement is used or the operator's familiarity with the machine response.

Thus, the parameters defining each of these possible curves are stored in database 36. The sub-system component is then controlled according to the control algorithm 37 stored in sub-system controller 35. Control algorithm 37 generates control signals based on the set of parameters selected by parameter scheduler 38. This is accomplished by the operator inputting a signal via user interface 48. Upon receiving a signal from user interface 48, parameter scheduler 38 then sends a signal to control algorithm 37 indicating which set of values to use from the parameter database 36 in controlling the sub-system component.

Figure 4:
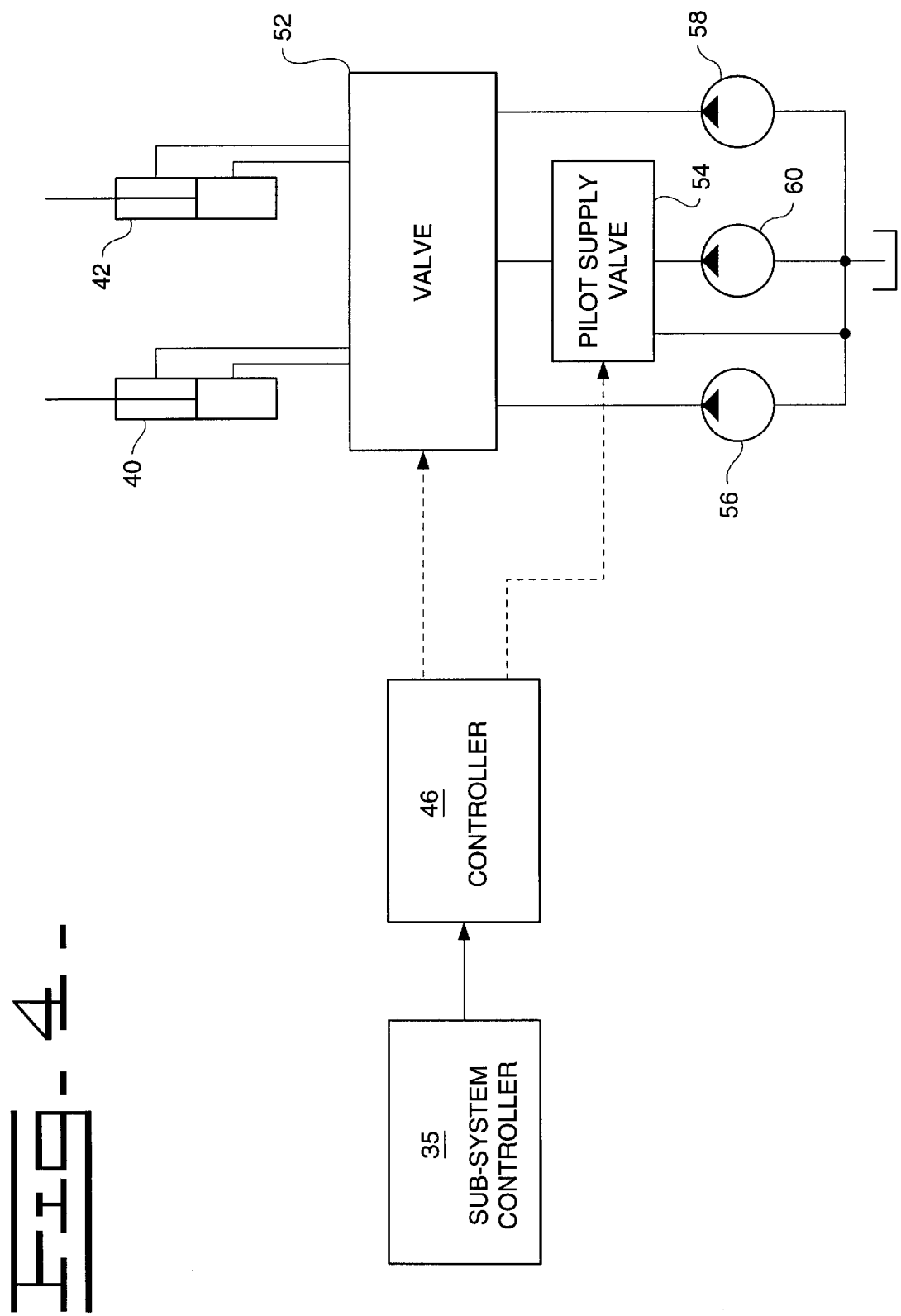
FIG. 4 is a block diagram of an electrohydraulic control system according to the present invention.

For example, in the work implement example of an electrohydraulic system, control algorithm 37 sends a command to component level controller 46 which controls corresponding cylinders, as shown in FIG. 4. In response to an operator input into sub-system controller 35 via levers 34, control algorithm 37 sends a command to component level controller 46 to control the speed of movement of the hydraulic cylinders in order to manipulate the work attachment 28 and the work implement 22. This is accomplished by coupling the controller 46 to a valve 52 that controls the speed of the flow of fluid in the hydraulic cylinders 40, 42 and 44.

The valve 52 may include multiple main valves (for example, two main valves for each of the hydraulic cylinders 40, 42) and multiple electrically actuated pilot valves (for example, two pilot or secondary valves for each main valve). The main valves direct pressurized fluid to the cylinders 40, 42 and the pilot valves direct pilot fluid flow to the main valves. Each pilot valve is electrically connected to the controller 46. Two main pumps 56, 58 are used to supply hydraulic fluid to the main spools, while a pilot pump 60 is used to supply hydraulic fluid to the pilot valves. Although the illustrated embodiment utilizes several pumps, it is to be understood that the invention can use any number of pumps, including a single pump. A pilot supply valve 54, also coupled to the controller 46, is included to control pilot fluid flow to the pilot valves.

The component level controller 46 preferably includes RAM and ROM modules that store software programs to carry out certain features of the present invention. Component level controller 46 receives the operator lever position signals from the levers 34 and responsively produce control signals to control the respective hydraulic cylinders 40, 42 and 44 at a desired speed. The valve 52 receives the control signals and controllably provides hydraulic fluid flow to the respective hydraulic cylinder in response to the position of the levers 34.

Although the component level controllers 46 shown in FIG. 2 are illustrated as separate controllers apart from the sub-system controller 35, it should be appreciated by those skilled in the art that all the controllers may be incorporated into one main controller. The number of controllers can depend on the implementation choices.

The user interface 48 may be a flat panel touch screen, a key pad, a combination of switches, or any other similar device for allowing a user to input a selection of the parameters. For example, in the touch screen implementation, the user can define one of the modulation curves shown in FIG. 3 by dragging mouse-like pointers on the screen to select any one of the modulation curves. In addition to the curve selection function, the user can modify the shape of the curve by dragging the mouse on the screen in a different direction. Similar adjustments to parameters of engine control, transmission control, steering control and the control of other sub-systems can be made.

In addition to the ability to change controller parameters, the user interface 48 may be used to monitor operating conditions of the machine and display them on the screen with graphical images. Therefore, all of the traditional cab input and display devices can be eliminated and displayed in various screens of the user interface 48. This results in significant savings while providing a very flexible user interface device.

Of course, various modifications of this invention would come within the scope of the invention. The main fundamental concept is to allow flexibility in changing the desired operating behavior of a sub-system component, and consequently machine response by changing machine settings through the set of parameters, using the user interface 48.

Industrial Applicability

In operating a machine, it may be desirable at times to modify the behavior of the machine according to the application it is being used, the operating and environmental conditions or according to the user's familiarity with the machine. To allow an operator to select the desired operating behavior of any of the sub-systems in the machine, a plurality of parameters associated with the operating behavior of the sub-system are stored in a database wherein the parameters have different sets of values associated therewith to define one of a plurality of acceptable operating behaviors for the sub-system. The user can then select one of those sets of values via a user interface 48 to control the sub-system according the user's preference. It is also possible for a user to customize values via use of a user interface, and then storing the values in a database. Based on the selected set of values of the parameters, a control algorithm 37 then reads those values, computes the appropriate outputs and controls the sub-system component accordingly.

Other aspects, objects and advantages of this invention can be obtained from a study of the drawings, the disclosure and the appended claims.

What is claimed is:

1. A method for altering operating behavior of a sub-system component of a machine to suit a user's preference, the method comprising:
    storing a plurality of parameters associated with the operating behavior of the sub-system component, the parameters having sets of values associated therewith wherein each set of values define one of a plurality of acceptable operating behaviors for the sub-system component;
    receiving a selection signal selecting one of the set of values of the parameters; and
    controlling the sub-system component based on the selected set of values for the parameters.

2. The method as recited in claim 1 further comprising monitoring operating conditions of the machine.

3. The method as recited in claim 2 further comprising displaying the operating conditions.

4. The method as recited in claim 1 wherein the sub-system component is a work implement in an electrohydraulic system.

5. A system for altering operating behavior of a sub-system component of a machine to suit a user's preference, the system comprising:
    a database for storing a plurality of parameters associated with the operating behavior of the sub-system component, the parameters having sets of values associated therewith wherein each set of values define one of a plurality of acceptable operating behaviors for the sub-system component; and
    a controller, in communication with the database, for receiving a selection signal selecting one of the set of values of the parameters and controlling the sub-system component based on the selected set of values for the parameters.

6. The system as recited in claim 5 wherein the controller comprises:
   a parameter scheduler for receiving the selection signal;
   a control algorithm for controlling the sub-system component according to the parameters and one of the sets of values associated therewith; and
   wherein the parameter scheduler is further operative to change the set of values used by the control algorithm.

7. The system as recited in claim 5 further comprising a user interface for generating the selection signal for receipt by the controller.

8. The system as recited in claim 7 wherein the user interface is a flat-panel touch-screen.

9. The system as recited in claim 7 wherein the user interface is a keyboard.

10. The system as recited in claim 7 wherein the user interface includes a plurality of switches.

11. The system as recited in claim 5 wherein the controller is further operative to monitor operating conditions of the machine.

12. The system as recited in claim 11 further comprising a display for displaying the operating conditions.

13. The system as recited in claim 5 wherein the sub-system component is a work implement in an electrohydraulic system.

* * * * *